US012746558B2

(12) United States Patent
Lutz et al.

(10) Patent No.: US 12,746,558 B2
(45) Date of Patent: Sep. 29, 2026

(54) PAINT NOZZLE MODULE FOR A PAINT SPRAYING DEVICE

(71) Applicant: J. WAGNER GmbH, Markdorf (DE)

(72) Inventors: Magnus Lutz, Salem (DE); Sebastian Mangold, Salem (DE); Peter Ibele, Horgenzell (DE)

(73) Assignee: J. WAGNER GmbH, Markdorf (DE)

( * ) Notice: Subject to any disclaimer, the term of this patent is extended or adjusted under 35 U.S.C. 154(b) by 339 days.

(21) Appl. No.: 18/245,674

(22) PCT Filed: Oct. 8, 2021

(86) PCT No.: PCT/EP2021/077801
§ 371 (c)(1),
(2) Date: Mar. 16, 2023

(87) PCT Pub. No.: WO2022/074172
PCT Pub. Date: Apr. 14, 2022

(65) Prior Publication Data
US 2023/0330688 A1 Oct. 19, 2023

(30) Foreign Application Priority Data
Oct. 9, 2020 (DE) ..................... 10 2020 126 476.3

(51) Int. Cl.
*B05B 1/30* (2006.01)
*B05B 7/24* (2006.01)

(52) U.S. Cl.
CPC .......... *B05B 1/3046* (2013.01); *B05B 7/2424* (2013.01)

(58) Field of Classification Search
CPC .............................. B05B 1/306; B05B 7/2424
(Continued)

(56) References Cited

U.S. PATENT DOCUMENTS 2,186,214 A * 1/1940 Simon ........................ F24F 6/12 239/118
3,463,363 A * 8/1969 Zelna ................... B23K 3/0607 222/504
(Continued)

FOREIGN PATENT DOCUMENTS

DE 2256517 A1 5/1973
DE 19633266 A1 2/1998
(Continued)

OTHER PUBLICATIONS

International Preliminary Report on Patentability for International Patent Application No. PCT/EP2021/077801, date of issuance: Mar. 28, 2023, 10 pages with English Translation.
(Continued)

*Primary Examiner* — Jason J Boeckmann
(74) *Attorney, Agent, or Firm* — Christopher J. Volkmann; KELLY, HOLT & CHRISTENSON PLLC

(57) ABSTRACT

A paint nozzle assembly for a paint spraying device for creating a paint spray jet. The paint nozzle assembly comprises a needle, a nozzle body and a seal. The nozzle body comprises a nozzle opening, a paint feed and a needle guide. The seal subdivides an interior enclosed by the nozzle body into an antechamber and a paint chamber. The seal is connected fixedly to the needle, and the seal is in the form of a membrane seal and is connected fixedly to the nozzle body. The interior comprises a diverging portion as far as the needle guide.

18 Claims, 8 Drawing Sheets

(58) Field of Classification Search
USPC .......................... 239/306, 398, 407, 410, 412
See application file for complete search history.

(56) References Cited

U.S. PATENT DOCUMENTS

| | | | | |
|---|---|---|---|---|
| 3,977,608 | A | 8/1976 | Bullock | |
| 4,228,958 | A * | 10/1980 | Perry | B05B 7/0815 239/411 |
| 6,378,783 | B1 | 4/2002 | Ballu | |
| 10,888,827 | B2 * | 1/2021 | Wendt | B05B 12/088 |
| 2017/0304853 | A1 * | 10/2017 | Krayer | B05B 15/62 |
| 2021/0301943 | A1 * | 9/2021 | Forget | B05B 1/3046 |
| 2023/0285996 | A1 * | 9/2023 | Fliess | B05C 5/0225 |

FOREIGN PATENT DOCUMENTS

| | | | |
|---|---|---|---|
| DE | 102018104209 | B3 | 1/2019 |
| EP | 1063018 | A1 | 12/2000 |
| EP | 1925859 | A1 | 5/2008 |
| WO | WO2017081276 | A1 | 5/2017 |

OTHER PUBLICATIONS

International Search Report and Written Opinion for International Patent Application No. PCT/EP2021/077801, mailing date of Feb. 1, 2022, 12 pages with English Translation of the International Search Report.

Search Report for German Patent Application No. 10 2020 126 476.3 dated Feb. 10, 2021, 9 pages.

* cited by examiner

PAINT NOZZLE MODULE FOR A PAINT SPRAYING DEVICE

CROSS-REFERENCES TO RELATED APPLICATIONS

This application is a Section 371 National Stage Application of International Application No. PCT/EP2021/077801, filed Oct. 8, 2021, and published as WO 2022/074172A1 on Apr. 14, 2022, and claims priority to German Application No. 10 2020 126 476.3, filed Oct. 9, 2020, the contents of each are hereby incorporated by reference in their entirety.

DETAILED DESCRIPTION

Figure 1:
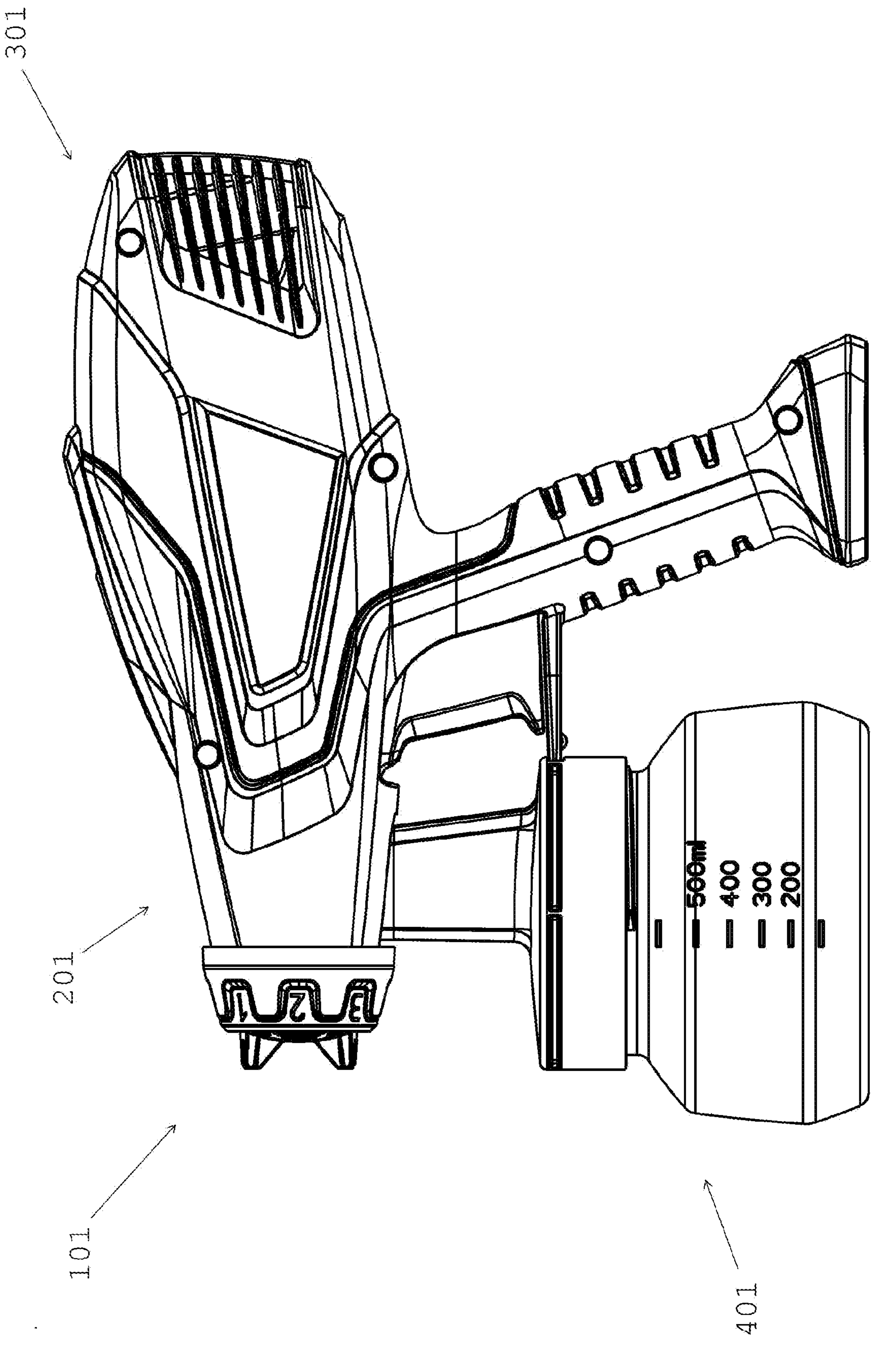
FIGS. 1-3 show a paint spraying device, according to one example, in a side view, a sectional side view and an exploded view.

The present disclosure relates to a paint nozzle assembly for a paint spraying device for creating a paint spray jet according to the preamble of claim 1 and to a paint spraying device according to the preamble of claim 12.

WO 2017/081276 A1 discloses a paint nozzle assembly for a paint spraying device for creating a paint spray jet, wherein the paint nozzle assembly comprises a needle, a nozzle body and a seal, wherein the nozzle body comprises a nozzle opening, a paint feed and a needle guide, and wherein the seal subdivides an interior enclosed by the nozzle body into an antechamber and a paint chamber.

The present disclosure is based on the object of creating, in a paint nozzle assembly or a paint spraying device, increased installation space for the seal and at the same time minimizing a volume of a paint chamber with the nozzle closed.

This object is achieved, proceeding from the features in the preambles of claims 1 and 12, respectively, by the characterizing features of claims 1 and 12, respectively. The respective dependent claims specify advantageous and expedient developments of claims 1 and 12, respectively.

The paint nozzle assembly according to one example for a paint spraying device for creating a paint spray jet comprises a needle, a nozzle body and a seal, wherein the nozzle body comprises a nozzle opening, a paint feed and a needle guide, wherein the seal subdivides an interior enclosed by the nozzle body into an antechamber and a paint chamber, wherein the seal is connected fixedly to the needle, wherein the seal is in the form of a membrane seal and is connected fixedly to the nozzle body, wherein the interior comprises a diverging portion as far as the needle guide. The diverging portion creates increased installation space and thus room for movement for the seal in the form of a membrane seal, as a result of which it is possible to use a seal, in the form of a membrane seal, with a large outside diameter such that the deformations to which the seal in the form of a membrane seal is subjected in the different opening positions of the needle are minimized and the seal in the form of a membrane seal thus has a long service life.

The present disclosure also provides that, with the paint nozzle closed, the seal is deformed in the direction of the nozzle opening by the needle in such a way that it bears partially on a front inner lateral surface of the diverging portion such that a volume of the paint chamber is minimized. As a result, a paint chamber in the paint nozzle assembly is kept particularly small with the paint nozzle closed, such that at most a small quantity of paint can dry up in the paint nozzle assembly, thereby making cleaning easier since only a small quantity of paint residues have to be removed.

The present disclosure also provides that, with the paint nozzle fully open, the seal is deformed in the direction of the needle guide by the needle in such a way that it bears on a rear inner lateral surface of the diverging portion. As a result of the seal bearing flat on the rear inner lateral surface, it is relieved of load during the maximum volume flow of the paint. This likewise increases the service life of the seal.

The present disclosure also provides that the paint nozzle assembly comprises a compression spring, wherein the compression spring is clamped in place between the needle guide and a collar of the needle in such a way that the needle is extracted from the nozzle opening. As a result, it is easier to clean the paint nozzle assembly since the paint chamber can be flushed via paint feed and the nozzle opening, which is automatically cleared of the needle, without it being necessary for the needle to be acted upon with an implement. As a result of such a design of the paint nozzle assembly, it is possible to dispense with a crosspin passing through the needle, which crosspin would otherwise be necessary in order to retract the needle. As a result, both the assembly and the disassembly of the paint nozzle assembly are significantly simplified.

The present disclosure furthermore provides that the nozzle body comprises a cylinder-like shell, wherein the needle guide is formed by a plate-like perforated disk which is integrally formed on an inner lateral surface of the cylinder-like shell, wherein a wall of the plate-like perforated disk is inclined from the shell in the direction of the compression spring. As a result, the needle guide can transmit high compressive forces of the compression spring to the cylinder-like shell of the nozzle body, with the result that damage to the nozzle body is precluded even when strong compression springs are used.

The present disclosure also provides that the nozzle body is formed in two parts and comprises a front nozzle body portion with the nozzle opening and the paint feed and a rear nozzle body portion with the needle guide, wherein the front nozzle body portion comprises a rear flange comprising two stages, wherein the rear nozzle body portion comprises a front flange comprising two stages, wherein end faces of the respectively outer stages bear on one another and are in particular ultrasonically welded or produced as a subsequent plastics overmolding by means of so-called insert parts or screwed together or adhesively bonded or held together by at least one clamp, and wherein end faces of the respectively inner stages lie opposite one another with the seal clamped in between. This ensures that the nozzle body portions are held together reliably and in a liquid-tight manner and also safeguards a reliable connection of the seal and nozzle body.

The present disclosure furthermore provides that the needle and the seal are formed in one piece, wherein the seal is formed from a plastic and is molded onto the needle. As a result, the assembly of the paint nozzle assembly is simplified. In this regard, the injection molding process could be embodied in two stages, in particular if the needle and the membrane are produced from different materials. Alternatively, the injection molding process could also be embodied in one stage, wherein, in this regard, the needle and the membrane are produced from the same material in one injection molding process.

The present disclosure also provides that the seal is connected to the needle by a form fit, wherein, in order to receive the perforated-disk-like seal, the needle comprises a radially encircling groove into which the seal is snap-fitted after elastic expansion. As a result, it is possible to produce paint nozzle assemblies with little complexity, the seals of which are suitable for different paints and/or pressures.

The present disclosure furthermore provides that the seal is connected to the needle by a force fit, wherein the needle is adhesively bonded or welded to the perforated-disk-like seal. As a result, it is likewise possible to produce paint nozzle assemblies with little complexity, the seals of which are suitable for different paints and/or pressures.

The present disclosure also provides that the rear inner lateral surface is formed by the needle guide. As a result, it is possible to dispense with additional components and material can be saved.

Finally, the present disclosure provides that the front inner lateral surface is formed in the region of the rear flange of the front nozzle body portion. In this region, the front inner lateral surface can be formed in a technically simple manner as a draft angle on a front nozzle body portion in the form of an injection molding.

The paint spraying device according to one example for creating a paint spray jet comprises a front end, a back end, a paint container and a paint nozzle assembly, wherein the paint nozzle assembly is configured as claimed in at least one of claims 1 to 11. In this way, the advantages mentioned in relation to claims 1 to 11 are achieved for the paint spraying device.

The present disclosure also provides that the paint nozzle assembly is received between the front end and the back end in such a way that the paint nozzle assembly is both connected to the front end only by a form fit and/or by a force fit and connected to the back end only by a form fit and/or by a force fit. As a result, it is possible to separate the paint nozzle assembly from the remaining constituents of the paint spraying device with little effort, non-destructively and so as to be re-assemblable and to clean it with ease, or to replace it with a new or refurbished paint nozzle assembly and then to connect it to the remaining constituents of the paint spraying device again.

Finally, the present disclosure also provides that the paint spraying device comprises a fan, which is in particular in the form of a radial fan, for creating an air flow. As a result, it is possible to dispense with an air supply hose, thereby simplifying the handling of the paint spraying device.

For the purposes of the present disclosure, a paint nozzle assembly is understood to be an assembly with which a paint jet is able to be created and which comprises a longitudinally movable needle.

For the purposes of the present disclosure, a front end of a paint spraying device is understood to be a first housing half of the paint spraying device, to which a paint container is connected.

For the purposes of the present disclosure, a back end of a paint spraying device is understood to be a second housing half of the paint spraying device, on which a trigger is arranged.

For the purposes of the present disclosure, a seal in the form of a membrane seal is understood to be a perforated-disk-like seal, the thickness of which is small enough that the seal is elastically bendable such that a first ring encircling a hole in the seal and a second ring encircling an outer circumference of the seal can lie in mutually parallel and spaced-apart planes.

Further details of the present disclosure are described in the drawing on the basis of schematically illustrated exemplary embodiments.

Figure 2:
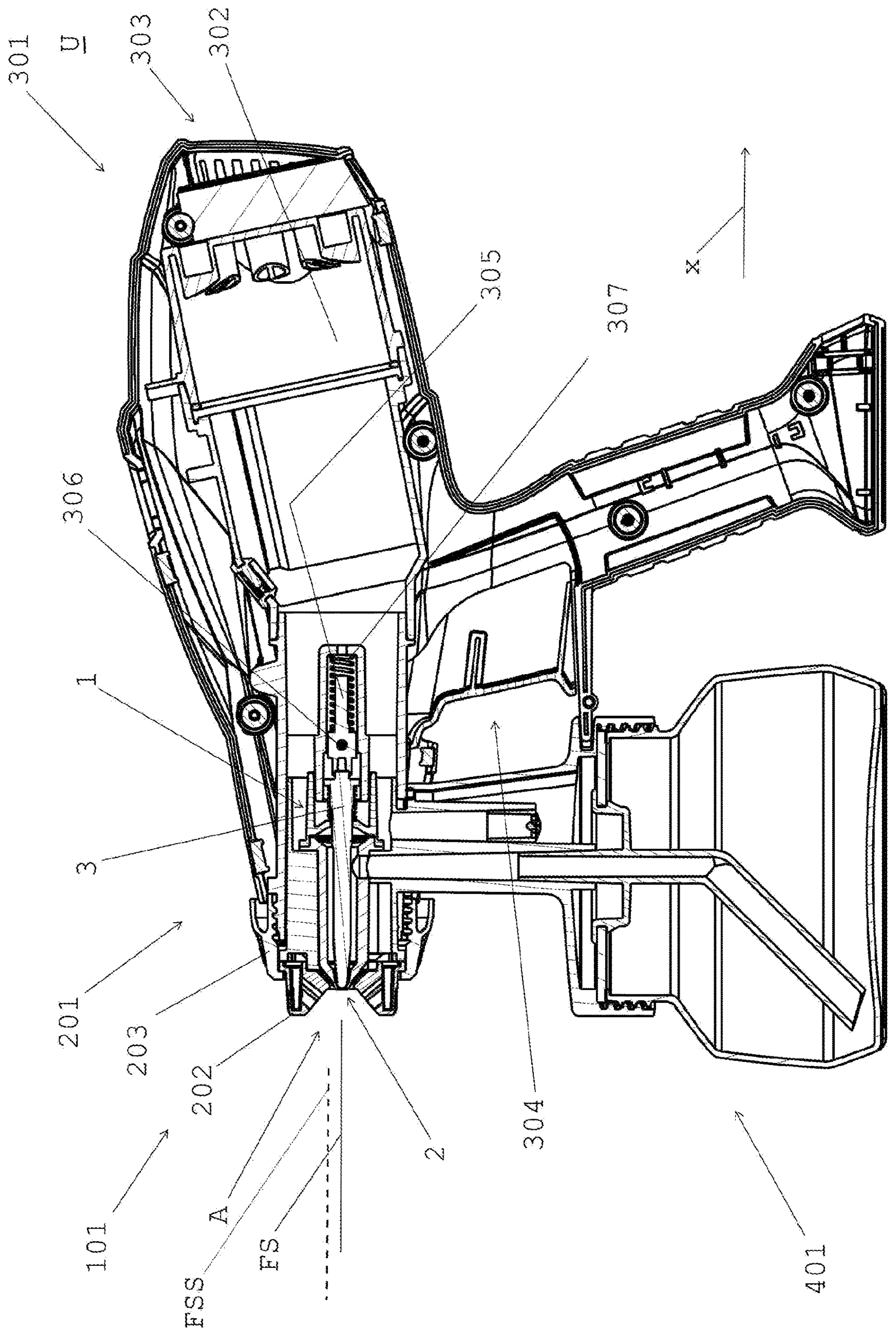
Figure 3:
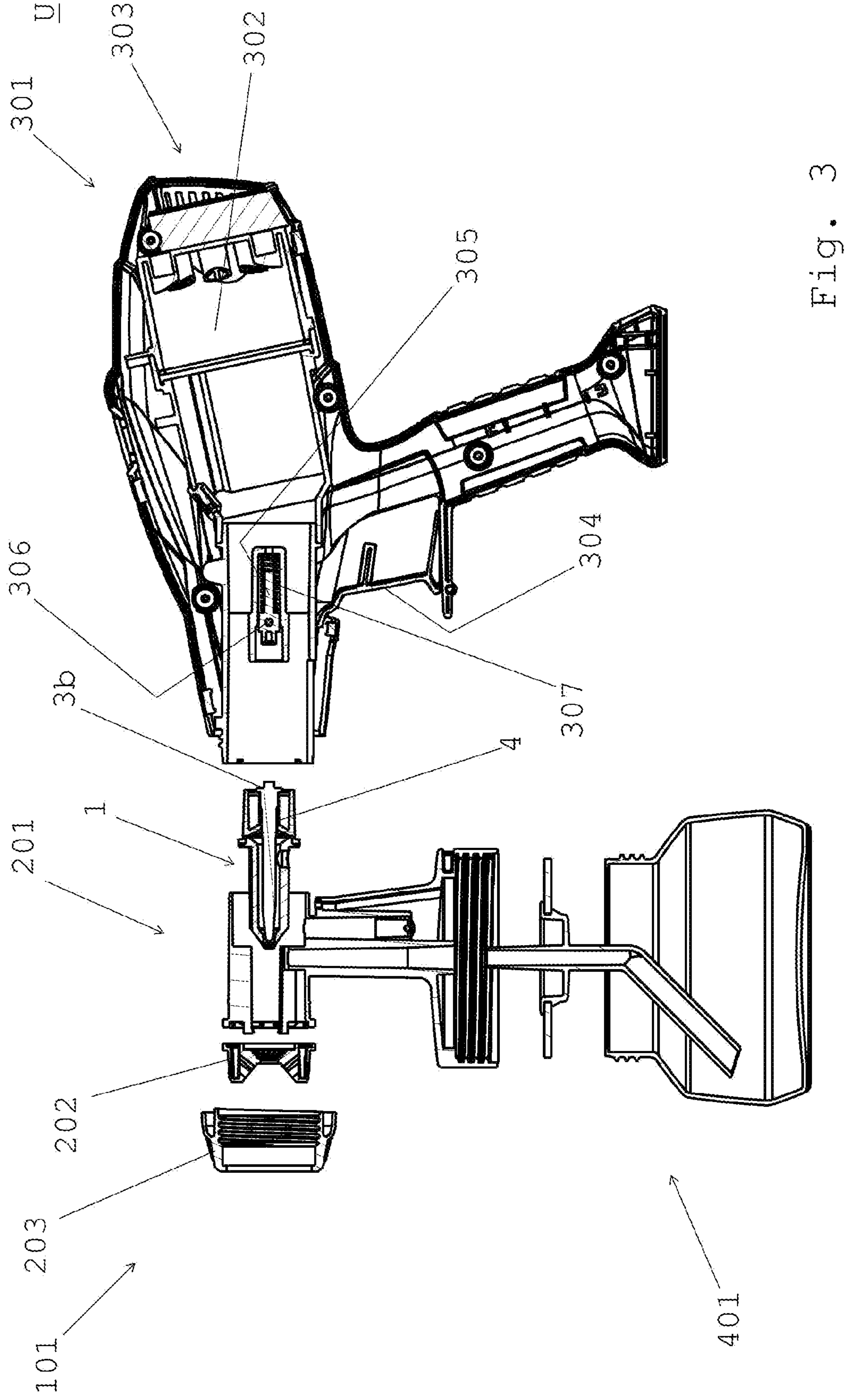

FIGS. 1 to 3 show a paint spraying device 101 according to one example in a side view, a sectional side view and an exploded view. The paint spraying device 101 comprises a front end 201, a back end 301, a paint container 401 and a paint nozzle assembly 1 accommodated between the front end 201 and the back end 301. In this case, the paint nozzle assembly 1 is visible only in FIGS. 2 and 3.

It is apparent from the exploded illustration in FIG. 3 that the paint nozzle assembly 1 is accommodated between the front end 201 and the back end 301, wherein the paint nozzle assembly 1, during assembly, is first of all plugged into the front end 201 until it comes into abutment and then the front end 201 together with the paint nozzle assembly 1 is introduced into the back end 301.

The front end 201 also comprises an air cap 202 and a union nut 203. Following the introduction of the front end 201 equipped with the paint nozzle assembly 1, it is screwed together with the back end 301 by means of the union nut 203 with the air cap 202 in between. The paint container 401 can be screwed into the front end 201 before or after the above-described assembly.

The back end 301 comprises an electric fan 302 (not illustrated in more detail) with which air is drawn in via inlets 303 from the environment U and is blown in the direction of the front end 201 such that the air is blown out around the paint nozzle assembly 1 and in the process past the paint nozzle assembly 1 via the air cap 202 such that, in operation, in accordance with the HVLP spray process, it passes back into the environment U together with a schematically illustrated paint jet FS emerging from the paint nozzle assembly 1 and forms a paint spray jet FSS therewith.

The back end 301 furthermore comprises a trigger 304. This acts, via a mechanism (not illustrated) on a crosspin 306 connected to a spring-loaded plunger 305 in such a way that the spring-loaded plunger 305 can be retracted against a tension spring 307 by means of the trigger 304.

Figure 5B:
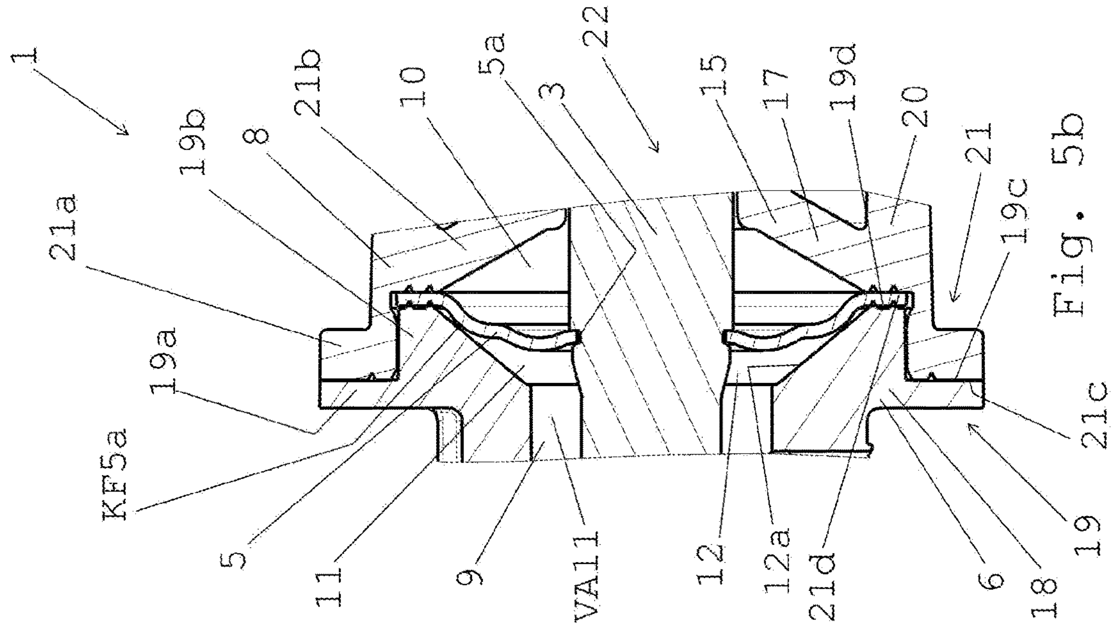
FIGS. 5*a* and 5*b* show a sectional side view of the paint nozzle assembly shown in FIG. 4 with the nozzle opening closed and a detail view in the region of the seal.
Figure 5A:
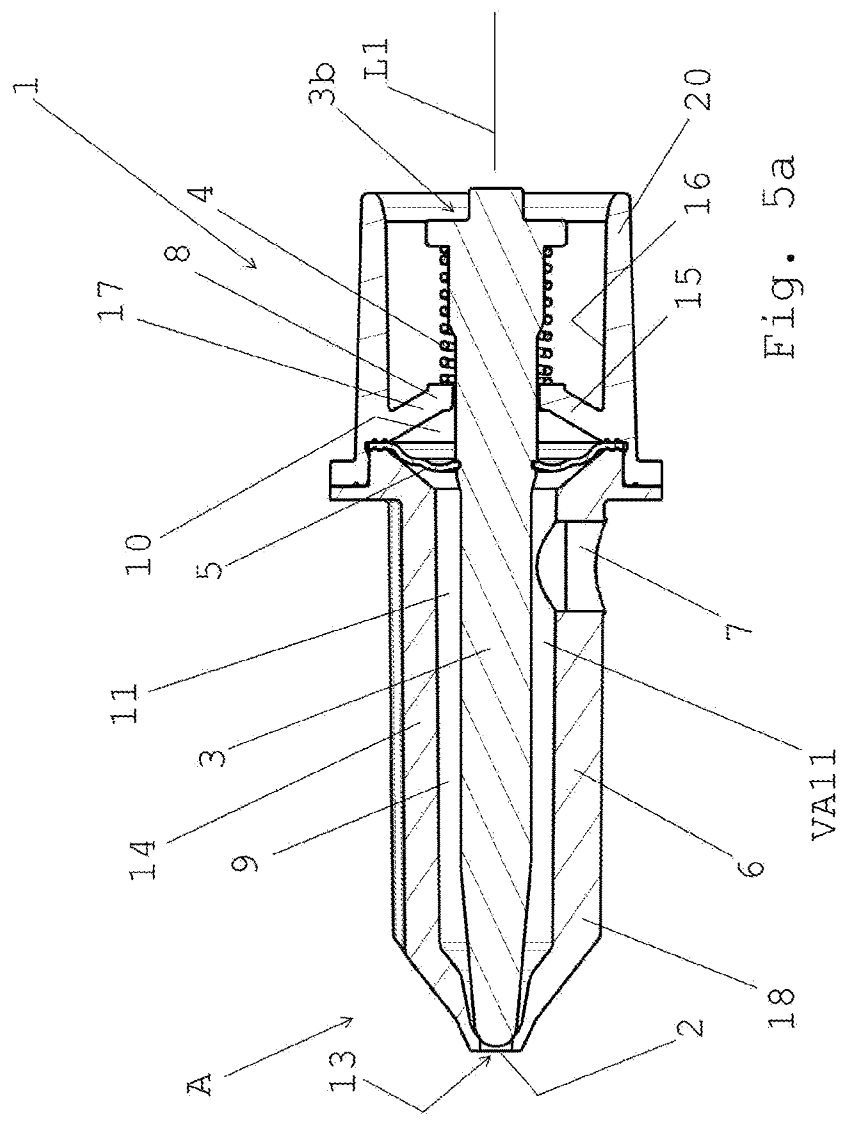
Figure 7B:
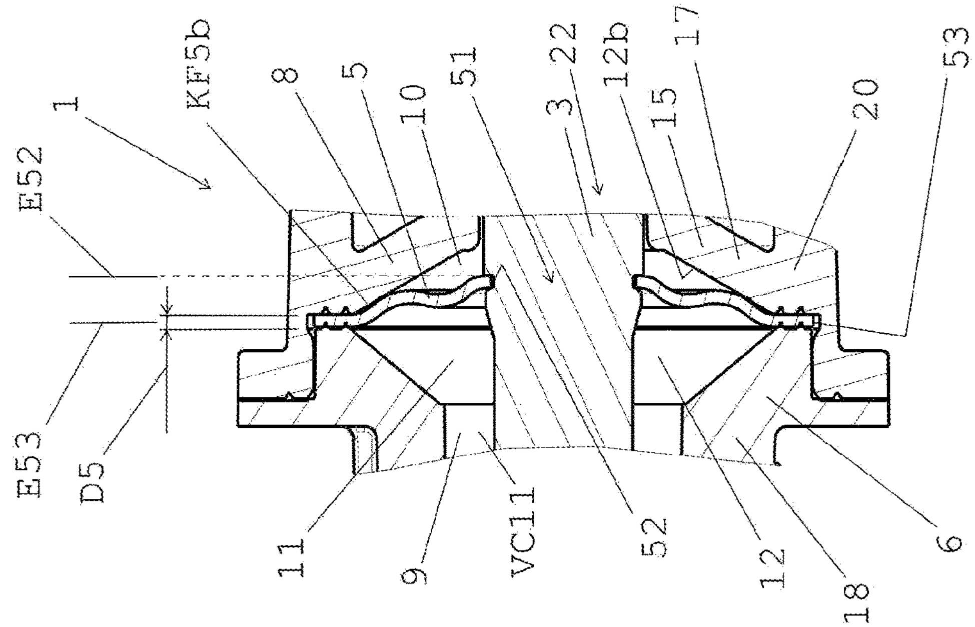
FIGS. 7*a* and 7*b* show a sectional side view of the paint nozzle assembly shown in FIG. 4 with the nozzle opening open and a detail view in the region of the seal.
Figure 7A:
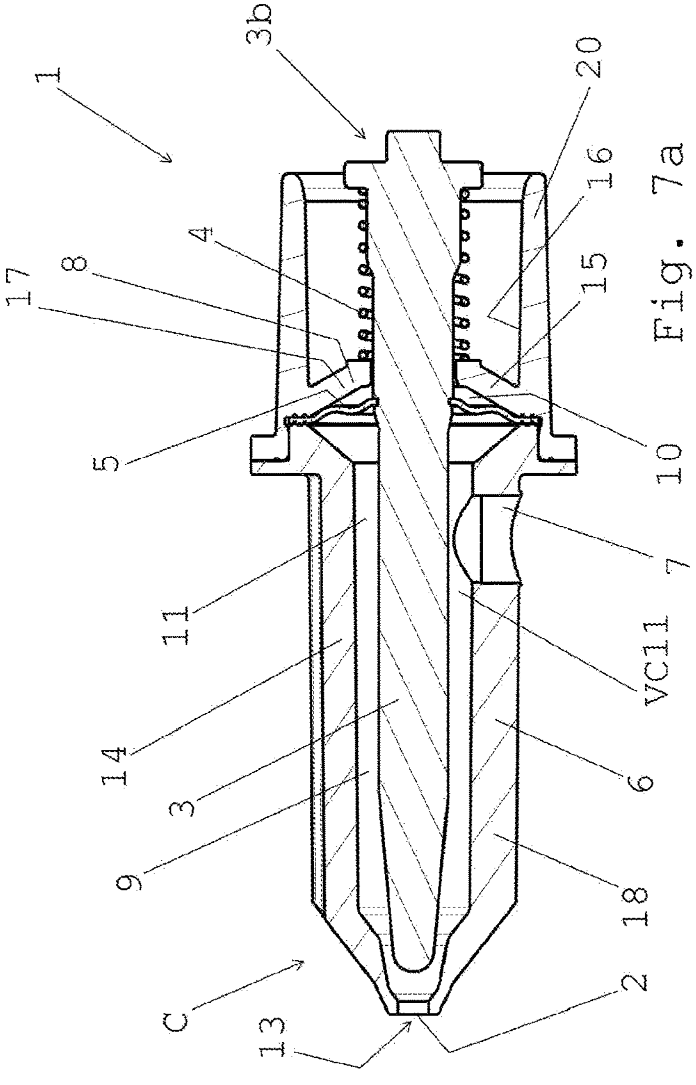

In the position illustrated in FIG. 2, a nozzle opening 2 of the paint nozzle assembly 1 is closed by a needle 3 of the paint nozzle assembly 1 since the trigger 304 has not been actuated and the tension spring 307 presses the plunger 305 against a rear end 3*b* (see FIG. 3) of the needle 3 with such a pressure force that it pushes the needle 3 out of an open position C shown in FIG. 7*a* into a closed position A shown in FIG. 2 and FIG. 5*a*, with a pressure force of a compression spring 4 sitting on the needle 3 being overcome. This occurs because the spring force of the tension spring 307 is greater than the pressure force of the compression spring 4.

If a user actuates the trigger 304 in the arrow direction x, the tension spring 307 is compressed such that the compression spring 4, supported by the needle guide 8 and bearing on a collar 3*c* of the needle 3, can push the needle 3 in the arrow direction x against the plunger 305 and the needle 3 leaves the closed position A shown in FIG. 5*a* in the direction of the open position C (see FIG. 7*a*), wherein the plunger 305 is moved in the arrow direction x by the needle in the process.

Figure 4:
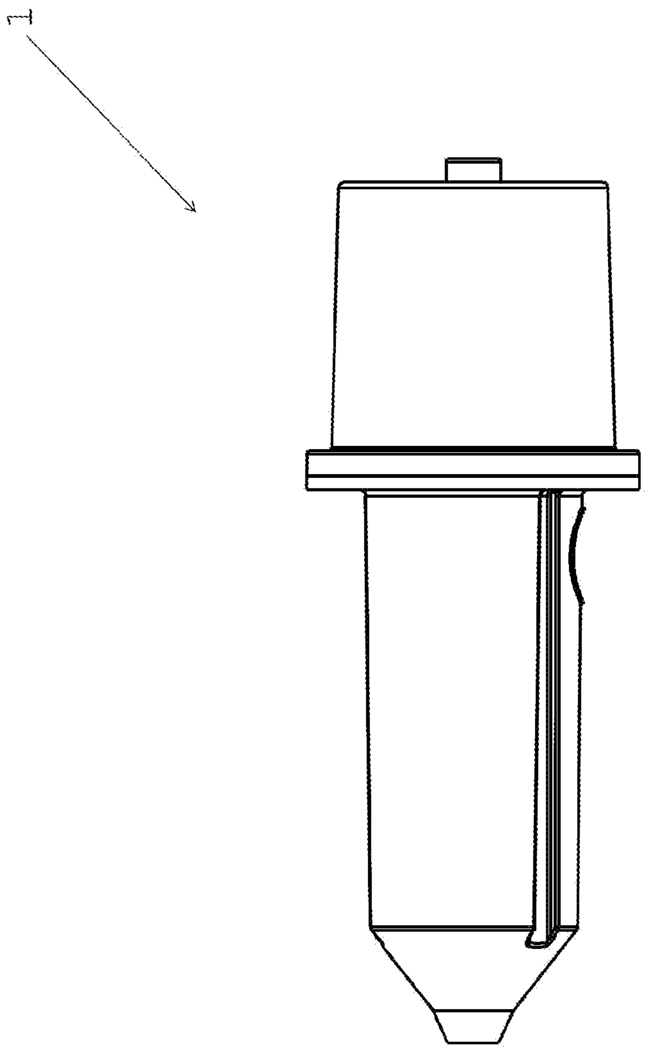
FIG. 4 shows a side view of the paint nozzle assembly from FIGS. 2 and 3.
Figure 6B:
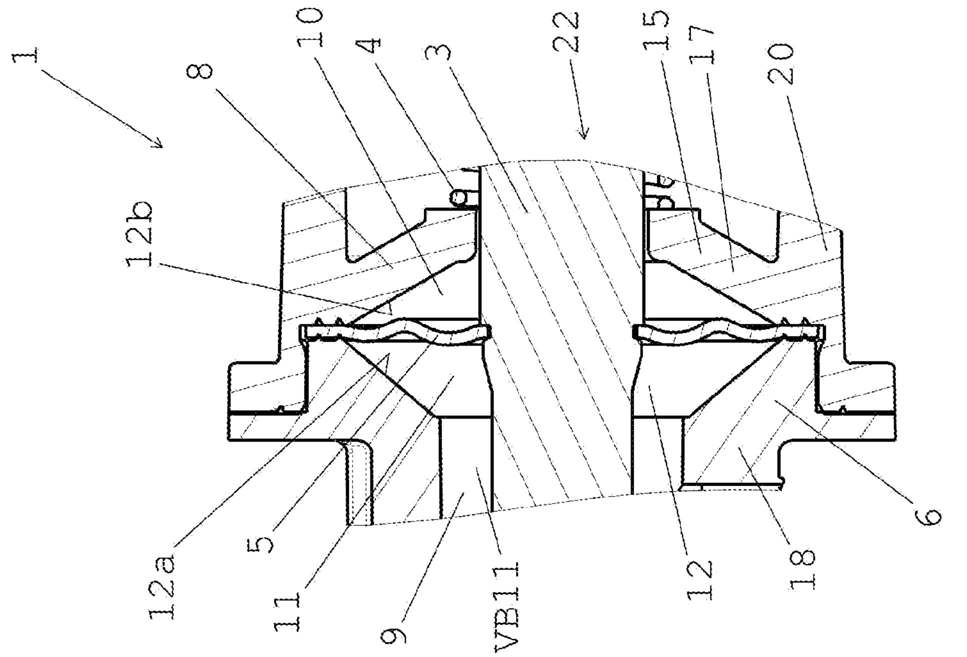
FIGS. 6*a* and 6*b* show a sectional side view of the paint nozzle assembly shown in FIG. 4 with the nozzle opening half open and a detail view in the region of the seal.
Figure 6A:
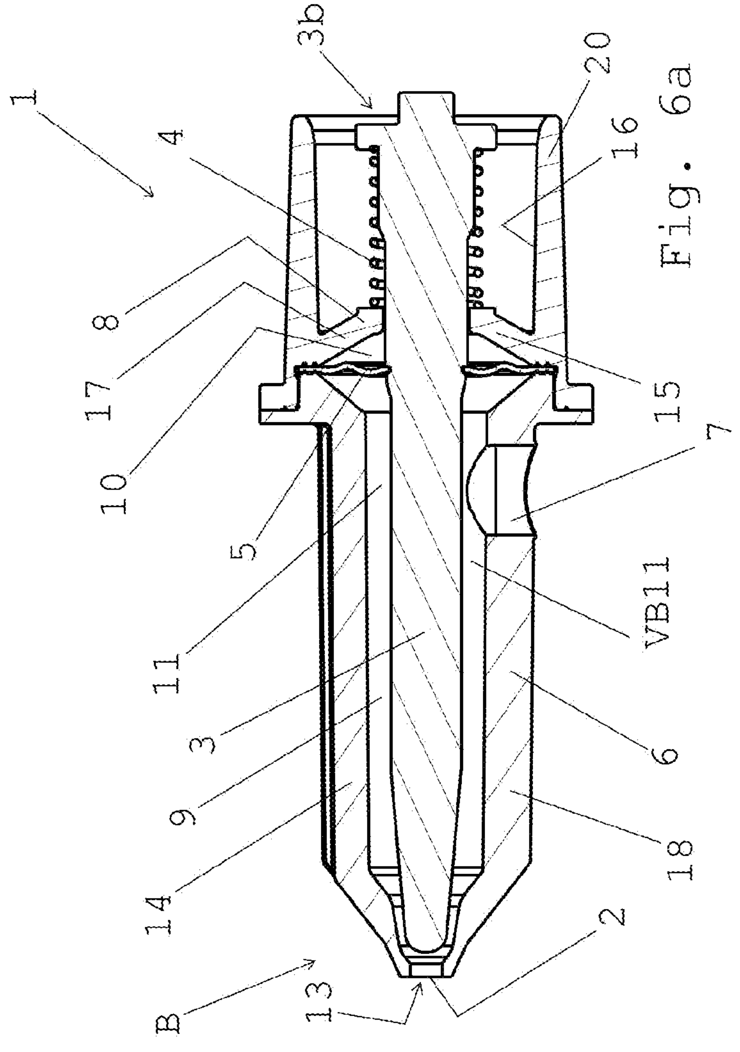

FIG. 4 shows the paint nozzle assembly 1 in a side view and FIGS. 5*a*, 6*a* and 7*a* each show the paint nozzle assembly 1 in a sectional side view, wherein the needle 3, a seal 5 and the compression spring 4 are in different positions, namely the closed position A (see FIG. 5*a*), the open position C (see FIG. 7*a*) or an intermediate position B (see FIG. 6*a*). FIGS. 5*b*, 6*b* and 7*b* each show a detail view, corresponding to FIGS. 5*a*, 6*a* and 7*a*, respectively, of the paint nozzle assembly 1 in the region of the seal 5.

It is apparent from FIG. 5*a* that the needle 3 is surrounded by a nozzle body 6. The nozzle body 6 comprises a nozzle opening 2, a paint feed 7 and a needle guide 8. The seal 5 subdivides an interior 9 enclosed by the nozzle body 6 into an antechamber 10 and a paint chamber 11. The seal 5 is in the form of a membrane seal and is connected fixedly to the needle 3. Furthermore, the seal 5 in the form of a membrane seal is connected fixedly to the nozzle body 6. The interior 9 comprises a diverging portion 12 toward the needle guide 8.

The needle 3 and the nozzle opening 2 form a paint nozzle 13.

In this case, with the paint nozzle 13 closed or with the needle 3 in the closed position A, the seal 5 is deformed in the direction of the nozzle opening 2 in such a way that it bears partially on a front inner lateral surface 12*a* of the diverging portion 12 such that a volume VA11 of the paint chamber 11 is minimized both compared with a volume VB11 that the paint space 11 adopts in the intermediate position B and compared with a volume VC11 that the paint chamber 11 adopts in the open position C. In this case, in the closed position A of the needle 3, the seal 5 bears on the front inner lateral surface 12*a* by way of a front face KF5*a* in the form of a circular ring (see FIGS. 5*a* and 5*b*). In this case, in the open position C of the needle 3, the seal 5 bears on a rear inner lateral surface 12*b* of the diverging portion by way of a rear face HF5*b* in the form of a circular ring (see FIGS. 7*a*, 7*b*).

In the intermediate position B of the needle 3, the seal 5 lies between the front inner lateral surface 12*a* and the rear inner lateral surface 12*b* of the diverging portion 12 of the interior 9 without contact by way of the front face KF5*a* in the form of a circular ring and the rear face KF5*b* in the form of a circular ring (see FIGS. 6*a*, 6*b*).

In this way, in the open position C of the needle 3, i.e. with the paint nozzle 13 fully open, the seal 5 can be supported on the rear inner lateral surface 12*b* such that it is loaded only little by the pressure of the paint flowing through the paint chamber 11.

The nozzle body 6 comprises a hollow-cylinder-like shell 14, wherein the needle guide 8 is formed by a plate-like perforated disk 15 which is integrally formed on an inner lateral surface 16 of the hollow-cylinder-like shell 14, and wherein a wall 17 of the plate-like perforated disk 15 is inclined from the shell 14 in the direction of the compression spring 4. As a result, the perforated disk 15, which forms the needle guide 8, is at an angle such that it can transmit a compressive force from the compression spring 4 readily to the shell 14.

In the illustrations in FIGS. 5*a* to 7*b*, it can be assumed that these figures show the paint nozzle assembly 1 in the installed state, and so it can always be assumed that the spring-loaded plunger (see FIG. 2), depending on the position of the trigger, presses against the free end 3*b* of the needle 3 such that the compression spring 4, as shown in FIGS. 5*a*, 6*a* and 7*a*, is compressed to different extents. In this case, the compression spring 4 is compressed to the greatest extent in the closed position A (FIG. 5*a*) and in this case the compression spring 4 is compressed to the least extent in the open position C (FIG. 7*a*).

It is also apparent from FIGS. 5*a* to 7*b* that the nozzle body 5 is formed in two parts and comprises a front nozzle body portion 18 with the nozzle opening 2 and the paint feed 7 and a rear nozzle body portion 20 with the needle guide 8. In this case, the front nozzle body portion 18 comprises a rear flange 19 comprising two stages 19*a*, 19*b*. In this case, the rear nozzle body portion 20 comprises a front flange 21 comprising two stages 21*a*, 21*b*. In this case, end faces 19*c*, 21*c* of the respectively outer stages 19*a*, 21*a* bear on one another and are ultrasonically welded. In this case, end faces 19*d*, 21*d* of the respectively inner stages 19*b*, 21*b* lie opposite one another with the seal 5 clamped in between (see FIG. 5*b*).

The seal 5 is connected to the needle 3 by a form fit, wherein, in order to receive the perforated-disk-like seal 5, the needle 3 comprises a radially encircling groove 5*a* (see FIG. 5*b*) into which the seal 5 is snap-fitted after elastic expansion. The needle 3 and the seal 5 together form a two-part movement insert 22 which is movable in the nozzle body 6 and relative to the nozzle body 6 along a longitudinal axis L1 (see FIG. 5*a*) of the paint nozzle assembly 1.

The rear inner lateral surface 12*b* is formed by the needle guide 8. The front inner lateral surface 12*a* is formed in the region of the rear flange 19 of the front nozzle body portion 18.

It is apparent for example from FIG. 7*b* that the seal 5 in the form of a membrane seal is in the form of a perforated-disk-like seal which has a hole 51 in which the needle 3 is accommodated. A thickness D5 of the seal 5 is small enough that the seal is elastically deformable or elastically bendable such that an inner edge 52 of the seal 5, which surrounds the hole 51, and an outer edge 53 encircling the seal 5 lie in mutually parallel and spaced-apart planes E52 and E53 when the needle 3 is in the closed position A or the open position C or in a position between the intermediate position B and the closed position A or between the intermediate position B and the open position C.

Figure 8:
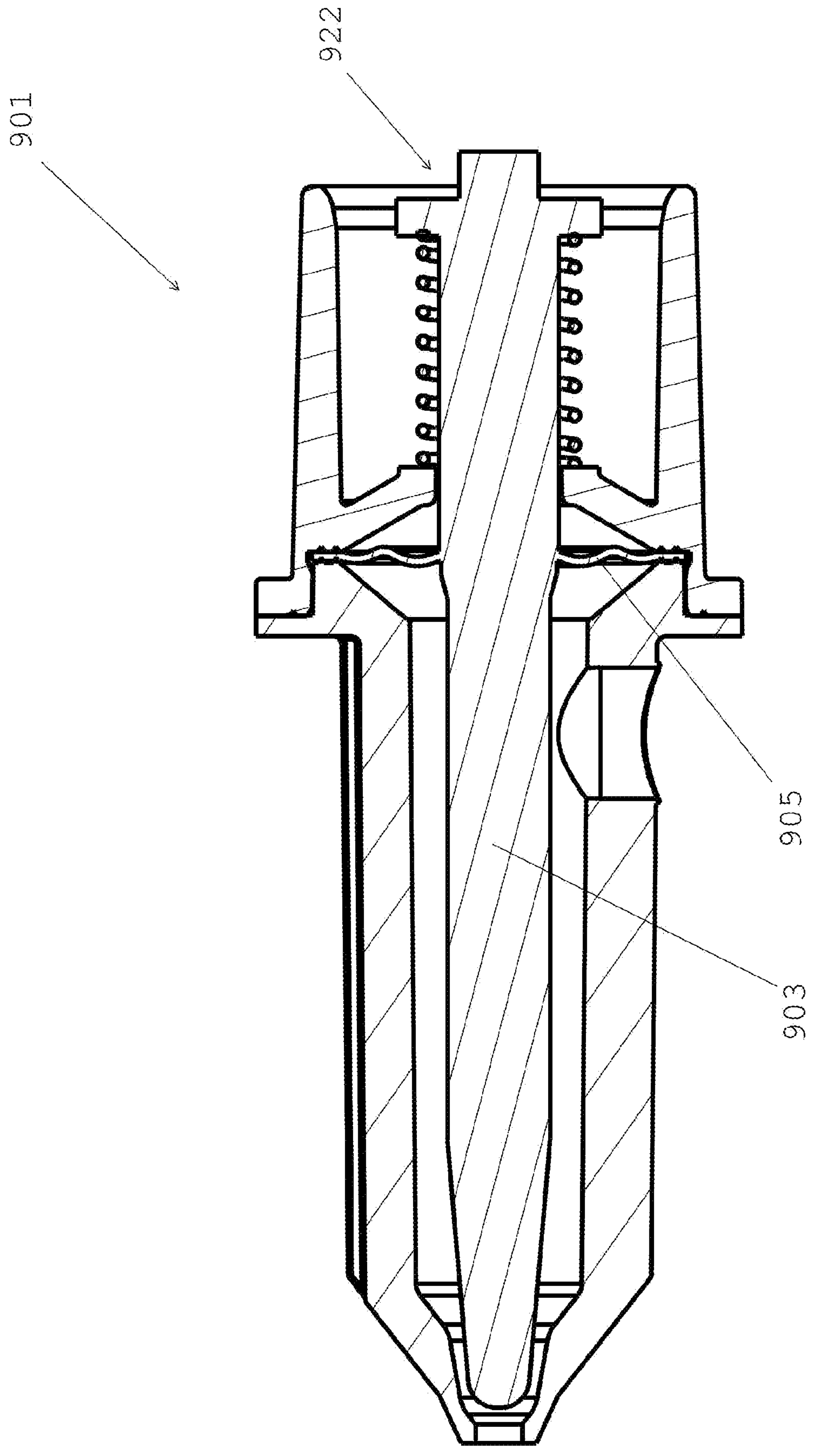
FIG. 8 shows a sectional side view of an embodiment variant of a paint nozzle assembly according to one example, which is shown analogously to FIG. 7*a* with the nozzle opening open.

FIG. 8 shows a sectional side view of a paint nozzle assembly 901. This paint nozzle assembly 901 represents, in relation to the paint nozzle assembly shown in the previous figures, an embodiment variant which differs from the variant shown in the previous figures only by having a different design of a movement insert 922. As such, with regard to the remaining components of the paint nozzle assembly 901 and with regard to the basic manner of operation thereof, reference is made to the description given for the paint nozzle assembly shown in the previous figures.

The movement insert 922 comprises a needle 903 and a seal 905, which are in the form of a one-piece component which forms the movement insert 922. In this case, the seal 905 is formed from a plastic and molded onto the needle 903.

According to a further embodiment variant that is not illustrated, provision may also be made for a movement insert to be configured such that the seal is connected to the needle by a force fit, wherein, in this regard, the needle is adhesively bonded or welded to the perforated-disk-like seal.

In all embodiment variants, when the needle is moved, a rolling deformation of the seal in the form of a membrane seal takes place. In this way, the paint nozzle assembly is subject to no wear, as occurs when a sliding seal is used.

According to an embodiment variant that is not illustrated, provision is also made for the paint nozzle assembly to be connected to a further component of the paint spraying device and in particular to the front end by a material bond.

Although the present invention has been described with reference to preferred embodiments, workers skilled in the art will recognize that changes may be made in form and detail without departing from the spirit and scope of the invention.

LIST OF REFERENCE SIGNS

1 Paint nozzle assembly of 101
2 Nozzle opening
3 Needle
3*b* Rear end of 3
3*c* Collar of 3
4 Compression spring of 3
5 Seal
5*a* Radially encircling groove
6 Nozzle body of 1
7 Paint feed of 6
8 Needle guide
9 Interior of 6
10 Antechamber of 90
11 Paint chamber of 9
12 Diverging portion of 11
12*a* Front inner lateral surface of 12
12*b* Rear inner lateral surface of 12
13 Paint nozzle
14 Hollow-cylinder-like shell
15 Plate-like perforated disk
16 Inner lateral surface
17 Wall of 15
18 Front nozzle body portion
19 Rear flange
19*a* Outer stage of 19
19*b* Inner stage of 19
19*c* End face of 19*a*
19*d* End faces of 19*b*
20 Rear nozzle body portion
21 Front flange
21*a* Outer stage
21*b* Inner stage
21*c* End face of 21*a*
21*d* End faces of 21*b*
22 Movement insert
51 Hole in 5
52 Inner edge of 5 around 51
53 Outer edge of 5
101 Paint spraying device
201 Front end of 101
202 Air cap
203 Union nut
301 Back end of 101
302 Electric fan
303 Inlet in 301 for U
304 Trigger
305 Spring-loaded plunger
306 Crosspin
307 Tension spring of 305
401 Paint container of 101
901 Paint nozzle assembly (embodiment variant)
903 Needle
905 Seal
922 Movement insert
A Closed position of 3
B Intermediate position of 3
C Open position of 3
D5 Thickness of 5
E52, E53 Plane of 52 and 53, respectively
FS Paint jet
FSS Paint spray jet
KF5 Face of 5 in the form of a circular ring
KF5*a* Front face in the form of a circular ring
KF5*b* Rear face in the form of a circular ring
L1 Longitudinal axis of 1
U Environment
VA11 Volume of 11 in the closed position A
VB11 Volume of 11 in the intermediate position B
VC11 Volume of 11 in the open position C
x Arrow direction

The invention claimed is:

1. A paint spraying device for creating a paint spray jet, the paint spraying device comprising:

a paint nozzle assembly removably couplable to the paint spraying device, the paint nozzle assembly including a needle configured to move between a closed position and an open position, a nozzle body having a front nozzle body portion and a back nozzle body portion, a compression spring, and a seal having a first portion and a second portion, a tension spring in operative communication with the compression spring, wherein a spring force of the tension spring is greater than a spring force of the compression spring such that the needle is actuated to the closed position when the paint nozzle assembly is coupled to the paint spraying device, and a trigger in operative communication with the tension spring, wherein the trigger, when actuated, compresses the tension spring such that the needle is actuated to the open position when the paint nozzle assembly is coupled to the paint spraying device, wherein the first portion of the seal is clamped between the front nozzle body portion and the back nozzle body portion, wherein the second portion of the seal is configured to deform, wherein the front nozzle body portion comprises a nozzle opening and a paint feed, wherein the back nozzle body portion comprises a needle guide configured to guide movement of the needle from the open position to the closed position, the needle guide having a wall, wherein the wall of the needle guide limits a deformity of the second portion of the seal, wherein the seal subdivides an interior enclosed by the nozzle body into an antechamber and a paint chamber, wherein the seal is connected fixedly to the needle, wherein the seal is in the form of a membrane seal and is connected fixedly to the nozzle body, wherein the compression spring is clamped in place between the needle guide and a rear collar of the needle, and wherein the spring force of the compression spring actuates the needle to the open position.

2. The paint spraying device as claimed in claim 1, wherein, when the needle is in the closed position, the seal is deformed in the direction of the nozzle opening such that the seal bears on a wall of the front nozzle body portion.

3. The paint spraying device as claimed in claim 1, wherein the nozzle body comprises a hollow cylindrical shell, and wherein the needle guide is formed by a perforated disk which is integrally formed on an inner lateral surface of the hollow cylindrical shell, wherein a wall of the perforated disk is inclined from the hollow cylindrical shell in the direction of the compression spring.

4. The paint spraying device as claimed in claim 1, wherein the front nozzle body portion comprises a rear flange comprising a first end face, wherein the back nozzle body portion comprises a front flange comprising a second end face, wherein the first end face bears against the second end face, wherein the first end face and the second end face are ultrasonically welded or produced as a subsequent plastics overmolding by means of so-called insert parts or screwed together or adhesively bonded or held together by at least one clamp, and wherein the first end face and the second end face lie opposite one another.

5. The paint spraying device as claimed in claim 1, wherein the needle and the seal are formed in one piece, wherein the seal is formed from a plastic and is molded onto the needle.

6. The paint spraying device as claimed in claim 1, wherein the seal is connected to the needle by a form fit, wherein, in order to receive the seal, the needle comprises a radially encircling groove into which the seal is snap-fitted after elastic expansion.

7. The paint spraying device as claimed in claim 1, wherein the seal is connected to the needle by a force fit or adhesive bond.

8. The paint spraying device as claimed in claim 1, wherein, when the needle is in the open position, the seal is deformed in the direction of the needle guide such that the seal bears on a wall of the needle guide.

9. The paint spraying device as claimed in claim 1, wherein the spring force of the compression spring actuates the needle to the open position when the paint nozzle assembly is separated from the paint spraying device.

10. A paint spraying device for creating a paint spray jet, the paint spraying device comprising:
- a body having a front end and a back end, wherein the front end is configured to connect to the back end;
- a paint container;
- a paint nozzle assembly removably couplable to the body, the paint nozzle assembly including a needle configured to move between a closed position and an open position, a compression spring, and a seal;
- a tension spring in operative communication with the compression spring, wherein a spring force of the tension spring is greater than a spring force of the compression spring such that the needle is actuated to the closed position when the paint nozzle assembly is coupled to the paint spraying device; and
- a trigger in operative communication with the tension spring, wherein the trigger, when actuated, compresses the tension spring such that the needle is actuated to the open position when the paint nozzle assembly is coupled to the paint spraying device;
- wherein the paint nozzle assembly includes a paint chamber and an antechamber;
- wherein the seal includes a first side facing the paint chamber and a second side facing the antechamber, the second side opposite the first side;
- wherein the first side facing the paint chamber includes a radially inward edge configured to contact the needle;
- wherein the second side facing the antechamber includes a radially outward edge configured to contact the paint nozzle assembly;
- wherein, when the needle is in an open position, the radially inward edge of the first side is positioned upstream of the radially outward edge of the second side;
- wherein the compression spring is positioned between the seal and a rear end of the needle; and
- wherein the spring force of the compression spring is configured to actuate the needle to the open position.

11. The paint spraying device as claimed in claim 10, wherein the paint nozzle assembly is received between the front end and the back end in such a way that the paint nozzle assembly is both connected to the front end only by a form fit and/or by a force fit and connected to the back end only by a form fit and/or by a force fit.

12. The paint spraying device as claimed in claim 10, wherein the paint nozzle assembly comprises a needle guide, and wherein, when the needle is in the open position, the seal is deformed in the direction of the needle guide such that the seal bears on a wall of the needle guide.

13. The paint spraying device of claim 10, wherein, when the needle is in the open position, the radially inward edge of the first side is positioned upstream of the radially outward edge of the second side, relative to a flow direction of the paint spray jet.

14. The paint spraying device of claim 13, wherein, when the needle is in the open position, the radially inward edge of the first side is spaced apart in an upstream direction from the radially outward edge of the second side.

15. The paint spraying device of claim 13, wherein the radially inward edge of the first side is spaced apart from the radially outward edge of the second side in a radial direction, relative to a spray axis formed by a direction of the paint spray jet.

16. A paint spraying device for creating a paint spray jet, the paint spraying device comprising:
- a body having a front end and a back end, wherein the front end is configured to connect to the back end;
- a paint container configured to connect to the front end;
- a paint nozzle assembly configured to be disposed between the front end and the back end, the paint nozzle assembly including a needle configured to move between a closed position and an open position, a nozzle body, a compression spring, and a membrane seal;
- a tension spring in operative communication with the compression spring, wherein a spring force of the tension spring is greater than a spring force of the compression spring such that the needle is actuated to the closed position when the paint nozzle assembly is coupled to the paint spraying device; and
- a trigger in operative communication with the tension spring, wherein the trigger, when actuated, compresses the tension spring such that the needle is actuated to the open position when the paint nozzle assembly is coupled to the paint spraying device;
- wherein the nozzle body comprises a nozzle opening, a paint feed, and a needle guide;
- wherein a wall of the needle guide is inclined toward the compression spring;
- wherein the compression spring is clamped in place between the wall of the needle guide and a collar of the needle such that the spring force of the compression spring actuates the needle to an open position;

wherein the membrane seal subdivides an interior space enclosed by the nozzle body into an antechamber and a paint chamber, wherein the interior space comprises a diverging portion; and wherein the membrane seal is connected fixedly to the needle.

17. The paint spraying device as claimed in claim 16, wherein the wall of the needle guide limits a deformity of the membrane seal.

18. The paint spraying device as claimed in claim 17, wherein the membrane seal includes a first side facing the paint chamber and a second side facing the antechamber, the second side opposite the first side, wherein the first side facing the paint chamber includes a radially inward edge configured to contact the needle, wherein the second side facing the antechamber includes a radially outward edge configured to contact the paint nozzle assembly, wherein, when the needle is in an open position, the radially inward edge of the first side is positioned upstream of the radially outward edge of the second side.

* * * * *